United States Patent
Luo et al.

(10) Patent No.: US 10,448,284 B2
(45) Date of Patent: Oct. 15, 2019

(54) WIRELESS COMMUNICATION APPARATUS, WIRELESS COMMUNICATION NODE, AND CHANNEL DETECTION METHOD

(71) Applicant: Huawei Technologies Co., Ltd., Shenzhen, Guangdong (CN)

(72) Inventors: Jun Luo, Shanghai (CN); Peter Loc, Cupertino, CA (US); Zhou Lan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 147 days.

(21) Appl. No.: 15/630,804

(22) Filed: Jun. 22, 2017

(65) Prior Publication Data

US 2017/0303167 A1  Oct. 19, 2017

Related U.S. Application Data (63) Continuation of application No. PCT/CN2014/094636, filed on Dec. 23, 2014.

(51) Int. Cl.
*H04W 4/00* (2018.01)
*H04W 28/20* (2009.01)
(Continued)

(52) U.S. Cl.
CPC .......... *H04W 28/20* (2013.01); *H04W 28/18* (2013.01); *H04W 40/24* (2013.01);
(Continued)

(58) Field of Classification Search
CPC ..... H04W 28/20; H04W 28/18; H04W 40/24; H04W 74/0808; H04W 74/04;
(Continued)

(56) References Cited

U.S. PATENT DOCUMENTS

| 9,635,649 B1 * | 4/2017 | Amiri ............... H04W 72/0406 |
| 10,045,340 B1 * | 8/2018 | Chu ....................... H04W 24/10 |

(Continued)

FOREIGN PATENT DOCUMENTS

| CN | 101084647 A | 12/2007 |
| CN | 101594346 A | 12/2009 |

(Continued)

OTHER PUBLICATIONS

"Part 11: Wireless LAN Medium Access Control (MAC) and Physical Layer (PHY) Specifications—Amendment 4: Enhancements for Very High Throughput for Operation in Bands below 6 Ghz", IEEE Std 802.11ac, Dec. 11, 2013, 425 pages.

(Continued)

*Primary Examiner* — Un C Cho
*Assistant Examiner* — Rasha K Fayed
(74) *Attorney, Agent, or Firm* — Kilpatrick Townsend & Stockton LLP (57) ABSTRACT

A wireless communication apparatus includes, a transceiver module performs data transmission; and a processing module selects a channel whose bandwidth is a to-be-detected bandwidth from a WLAN system. If there is no idle channel, detection is performed again after the to-be-detected bandwidth is reduced.

12 Claims, 7 Drawing Sheets

(51) Int. Cl.
  *H04W 28/18* (2009.01)
  *H04W 40/24* (2009.01)
  *H04W 74/08* (2009.01)
  *H04L 12/24* (2006.01)
  *H04W 48/08* (2009.01)
  *H04W 84/12* (2009.01)

(52) U.S. Cl.
  CPC ....... *H04W 74/0808* (2013.01); *H04L 41/083* (2013.01); *H04W 48/08* (2013.01); *H04W 84/12* (2013.01)

(58) Field of Classification Search
  CPC ..... H04W 74/08; H04W 48/08; H04W 84/12; H04W 72/0446; H04W 72/0486; H04W 72/1284; H04W 72/00; H04W 72/085; H04W 72/04; H04W 88/08; H04L 5/001; H04L 5/0007; H04L 5/00; H04L 25/0224; H04L 25/0206; H04L 25/0204; H04L 27/2601
  USPC .......................... 370/338, 252, 329
  See application file for complete search history.

(56) References Cited

U.S. PATENT DOCUMENTS

| | | |
|---|---|---|
| 2008/0273634 A1 | 11/2008 | Patel et al. |
| 2011/0299417 A1 | 12/2011 | Nanda et al. |
| 2012/0082147 A1* | 4/2012 | Liu .......................... H04L 5/001 370/338 |
| 2013/0136075 A1* | 5/2013 | Yu ..................... H04W 72/0453 370/329 |
| 2013/0176954 A1* | 7/2013 | Lv .......................... H04W 74/04 370/329 |
| 2013/0201835 A1 | 8/2013 | Banerjea et al. |
| 2014/0064101 A1 | 3/2014 | Hart et al. |
| 2015/0189536 A1* | 7/2015 | Venkatesh ............. H04L 5/0073 370/230 |
| 2015/0327139 A1* | 11/2015 | Sirotkin ................ H04W 76/20 370/332 |
| 2015/0334708 A1* | 11/2015 | Lee .......................... H04L 1/00 370/329 |

FOREIGN PATENT DOCUMENTS

| | | |
|---|---|---|
| CN | 102448125 A | 5/2012 |
| CN | 102595569 A | 7/2012 |
| CN | 102656941 A | 9/2012 |
| CN | 103220065 A | 7/2013 |
| CN | 103249050 A | 8/2013 |
| WO | 2006045097 A2 | 4/2006 |

OTHER PUBLICATIONS

"Part 11: Wireless LAN Medium Access Control (MAC) and Physical Layer (PHY) Specifications—Amendment 5: Enhancements for Higher Throughput", IEEE Std 802.11n, Oct. 29, 2009, 536 pages.

* cited by examiner

WIRELESS COMMUNICATION APPARATUS, WIRELESS COMMUNICATION NODE, AND CHANNEL DETECTION METHOD

CROSS-REFERENCE TO RELATED APPLICATIONS

This application is a continuation of International Application No. PCT/CN2014/094636, filed on Dec. 23, 2014, which is hereby incorporated by reference in its entirety.

TECHNICAL FIELD

The present application relates to the field of wireless communications technologies, and in particular, to a wireless communication apparatus, a wireless communication node, and a channel detection method.

BACKGROUND

With development of mobile Internet and popularization of intelligent terminals, data traffic shows an explosive growth tendency. A WLAN (wireless local area network) becomes one of mainstream mobile broadband access technologies owing to its advantages in aspects of a high rate and low costs.

Generally, a WLAN system includes a primary channel and multiple secondary channels. Currently, bandwidths of the primary channel and the secondary channels are all 20 MHz, which is referred to as "basic bandwidth". A WLAN system complying with the 802.11n protocol ("802.11n system") can support 40 MHz multi-channel transmission, that is, a 40 MHz channel including one primary channel and one secondary channel is selected to perform data transmission. For an 802.11ac system, the system can support 160 MHz or 80+80 MHz multi-channel transmission.

In a WLAN system, at a MAC (Media Access Control) layer, data transmission is generally performed by using the CSMA/CA (Carrier Sense Multiple Access/Collision Avoidance, carrier sense multiple access with collision avoidance) competition mechanism. A WLAN node that is to send data, such as a STA (Station) or an AP (Access Point) performs carrier sense before sending data. If it is detected that energy of a channel exceeds a CCA (Clear Channel Assessment) threshold, the channel is considered to be busy, and the node does not send data on the channel; or if it is detected that energy of a channel is less than the CCA threshold, the channel is considered to be idle, and the node performs channel contention.

Currently, a WLAN system that supports multi-channel transmission, such as the 801.11n system and the 802.11ac system usually determines whether a channel is available according to a busy/idle state of the primary channel. For example, for the 802.11n system, a common CCA detection solution includes: Signal detection is used on the 20 MHz primary channel, and if detected signal energy is less than −82 dBm, it is considered that the 20 MHz primary channel is idle; energy detection is used on a 20 MHz secondary channel, and if detected signal energy is less than −62 dBm, it is considered that the 20 MHz secondary channel is idle; if both the 20 MHz primary channel and the 20 MHz secondary channel are in an idle state, an STA may perform 40 MHz multi-channel transmission.

The next-generation WiFi (Wireless Fidelity) 802.11ax protocol supports more flexible system bandwidth. Different from the 802.11ac system and the 802.11n system, an 802.11ax system uses an OFDMA mechanism. Therefore, use of system bandwidth is more flexible, and high bandwidth is more frequently used for transmission. If the foregoing CCA detection solution is still used, determining whether a channel is available depending on a busy/idle state of a primary channel greatly limits use of high bandwidth.

SUMMARY

Embodiments of the present disclosure provide a wireless communication apparatus, a wireless communication node, and a channel detection method, so that use of high bandwidth in a WLAN system is not limited by a busy/idle state of a primary channel.

According to a first aspect, an embodiment of the present disclosure provides a wireless communication apparatus, including a transceiver and a processor, where the transceiver is configured to perform data transmission; and the processor is configured to execute processing of the following steps:

performing a step of selecting a channel, where the step specifically includes: selecting a channel whose bandwidth is a to-be-detected bandwidth from the WLAN system, where the to-be-detected bandwidth is an integer multiple of a basic bandwidth of the WLAN system, and an initial value is greater than the basic bandwidth of the WLAN system; detecting whether the selected channel whose bandwidth is the to-be-detected bandwidth is idle; and when a detection result is idle, controlling the transceiver to use the channel to perform data transmission; or when a detection result is busy, selecting another channel whose bandwidth is the to-be-detected bandwidth from the WLAN system, and returning to the step of detecting whether the selected channel whose bandwidth is the to-be-detected bandwidth is idle; and when the following condition is met, reducing the to-be-detected bandwidth and returning to the step of selecting a channel:

in the step of selecting a channel, it is detected that all selected channels whose bandwidth is the to-be-detected bandwidth in the WLAN system are busy, and the to-be-detected bandwidth is greater than the basic bandwidth of the WLAN system.

According to a second aspect, an embodiment of the present disclosure provides a computer program product used for wireless communication, including a computer readable medium, where the computer readable medium includes an instruction that can be used to perform the following operation steps:

performing an operation step of selecting a channel, where the step specifically includes: selecting a channel whose bandwidth is a to-be-detected bandwidth from a WLAN system, where the to-be-detected bandwidth is an integer multiple of a basic bandwidth of the WLAN system, and an initial value is greater than the basic bandwidth of the WLAN system; detecting whether the selected channel whose bandwidth is the to-be-detected bandwidth is idle; and when a detection result is idle, using the channel to perform data transmission; or when a detection result is busy, selecting another channel whose bandwidth is the to-be-detected bandwidth from the WLAN system, and returning to the step of detecting whether the selected channel whose bandwidth is the to-be-detected bandwidth is idle; and when the following condition is met, reducing the to-be-detected bandwidth and returning to the step of selecting a channel:

in the step of selecting a channel, it is detected that all selected channels whose bandwidth is the to-be-detected bandwidth in the WLAN system are busy, and the to-be-detected bandwidth is greater than the basic bandwidth of the WLAN system.

According to a third aspect, an embodiment of the present disclosure provides a wireless communication node, including:

at least one antenna;

a transceiver, configured to perform data transmission by using the at least one antenna; and a processor, configured to execute processing of the following steps:

performing a step of selecting a channel, where the step specifically includes: selecting a channel whose bandwidth is a to-be-detected bandwidth from the WLAN system, where the to-be-detected bandwidth is an integer multiple of a basic bandwidth of the WLAN system, and an initial value is greater than the basic bandwidth of the WLAN system; detecting whether the selected channel whose bandwidth is the to-be-detected bandwidth is idle; and when a detection result is idle, controlling the transceiver to use the channel to perform data transmission; or when a detection result is busy, selecting another channel whose bandwidth is the to-be-detected bandwidth from the WLAN system, and returning to the step of detecting whether the selected channel whose bandwidth is the to-be-detected bandwidth is idle; and when the following condition is met, reducing the to-be-detected bandwidth and returning to the step of selecting a channel:

in the step of selecting a channel, it is detected that all selected channels whose bandwidth is the to-be-detected bandwidth in the WLAN system are busy, and the to-be-detected bandwidth is greater than the basic bandwidth of the WLAN system.

According to a fourth aspect, an embodiment of the present disclosure provides a channel detection method, including:

performing a step of selecting a channel, where the step specifically includes: selecting a channel whose bandwidth is a to-be-detected bandwidth from a WLAN system, where the to-be-detected bandwidth is an integer multiple of a basic bandwidth of the WLAN system, and an initial value is greater than the basic bandwidth of the WLAN system; detecting whether the selected channel whose bandwidth is the to-be-detected bandwidth is idle; and when a detection result is idle, using the channel to perform data transmission; or when a detection result is busy, selecting another channel whose bandwidth is the to-be-detected bandwidth from the WLAN system, and returning to the step of detecting whether the selected channel whose bandwidth is the to-be-detected bandwidth is idle; and when the following condition is met, reducing the to-be-detected bandwidth and returning to the step of selecting a channel:

in the step of selecting a channel, it is detected that all selected channels whose bandwidth is the to-be-detected bandwidth in the WLAN system are busy, and the to-be-detected bandwidth is greater than the basic bandwidth of the WLAN system.

In conclusion, according to the wireless communication apparatus, the wireless communication node, and the channel detection method provided in the embodiments of the present disclosure, during channel detection, the detection starts from a channel with a higher bandwidth, and a to-be-detected bandwidth is gradually reduced. This provides a flexible channel detection mechanism.

In one aspect, whether a primary channel is idle may not be considered during use of a channel. Therefore, the use of a channel is not limited by whether the primary channel is idle.

In another aspect, a detection manner from a higher bandwidth to a lower bandwidth may be used, so that an idle channel with a higher bandwidth can be detected more quickly. Channel detection efficiency is higher, and data transmission with a high bandwidth is more easily implemented.

DESCRIPTION OF EMBODIMENTS

Embodiments of the present disclosure provide a wireless communication apparatus, a wireless communication node, and a channel detection method, so as to provide a flexible channel detection mechanism. This mechanism can be used for a high-bandwidth WLAN system, such as an 802.11ax system, so that use of high bandwidth in the WLAN system is not limited by a busy/idle state of a primary channel.

Each implementation manner of the present disclosure relates to a WLAN node in a WLAN system. Optionally, the WLAN node may be an AP or a STA.

An access point (AP) may also be referred to as a wireless access point, a bridge, a hotspot, or the like, and may access a server or a communications network.

A station (STA) may further be referred to as a user, and may be a wireless sensor, a wireless communications terminal, or a mobile terminal, such as a mobile phone (or referred to as a "cellular" phone) that supports a WiFi communication function, or a computer with a wireless communication function. For example, the station may be a portable, pocket-sized, handheld, computer built-in, wearable, or vehicle-mounted wireless communication apparatus that supports a WiFi communication function, and the wireless communication apparatus exchanges communication data, such as voice or data with a network side by using an AP.

Figure 1A:
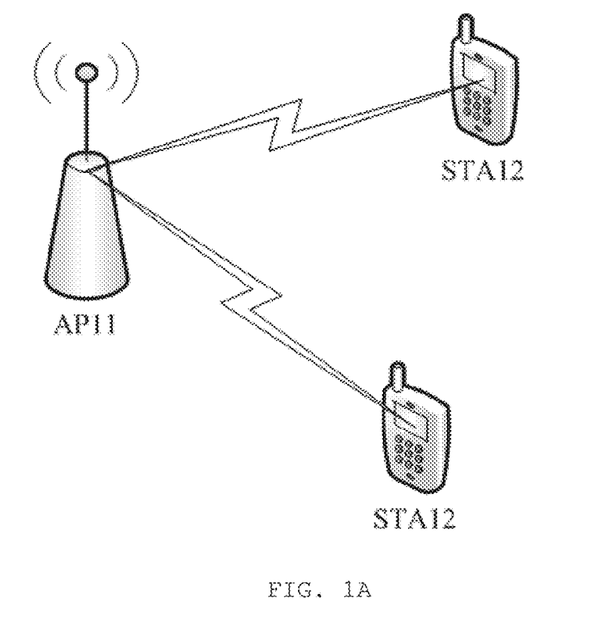
FIG. 1A is a simple schematic diagram of a WLAN system of an application of an implementation manner of the present disclosure.

FIG. 1A is a simple schematic diagram of a WLAN system of an application of an implementation manner of the present disclosure. The system in FIG. 1A includes one or more access points AP11 and one or more stations STA12.

Either of the access point 11 and the station 12 performs carrier sensing before sending data. If it is detected that energy of a channel exceeds a CCA (Clear Channel Assessment) threshold, it is considered that the channel is busy, and the node does not send data on the channel; or if it is detected that energy of a channel is less than the CCA threshold, it is considered that the channel is idle, and the node performs channel contention.

In implementation manners of the present disclosure, in one aspect, whether a primary channel is idle may not be considered during use of a channel. Therefore, the use of a channel is not limited by whether the primary channel is idle.

In another aspect, a detection manner from a higher bandwidth to a lower bandwidth may be used, so that an idle channel with a higher bandwidth can be detected more quickly. Channel detection efficiency is higher, and data transmission with a high bandwidth is more easily implemented.

The following describes the embodiments of the present disclosure in detail with reference to the accompanying drawings.

For clarity of description, Table 1 describes each embodiment of the present disclosure and a corresponding list of the accompanying drawings.

TABLE 1

Figure 1B:
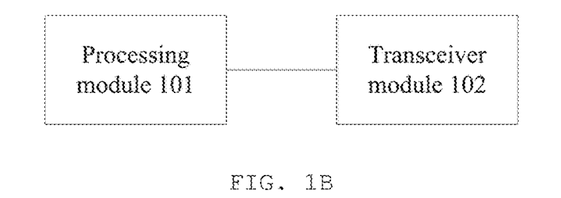
FIG. 1B is a schematic structural diagram of a first wireless communication apparatus according to an embodiment of the present disclosure.
Figure 2:
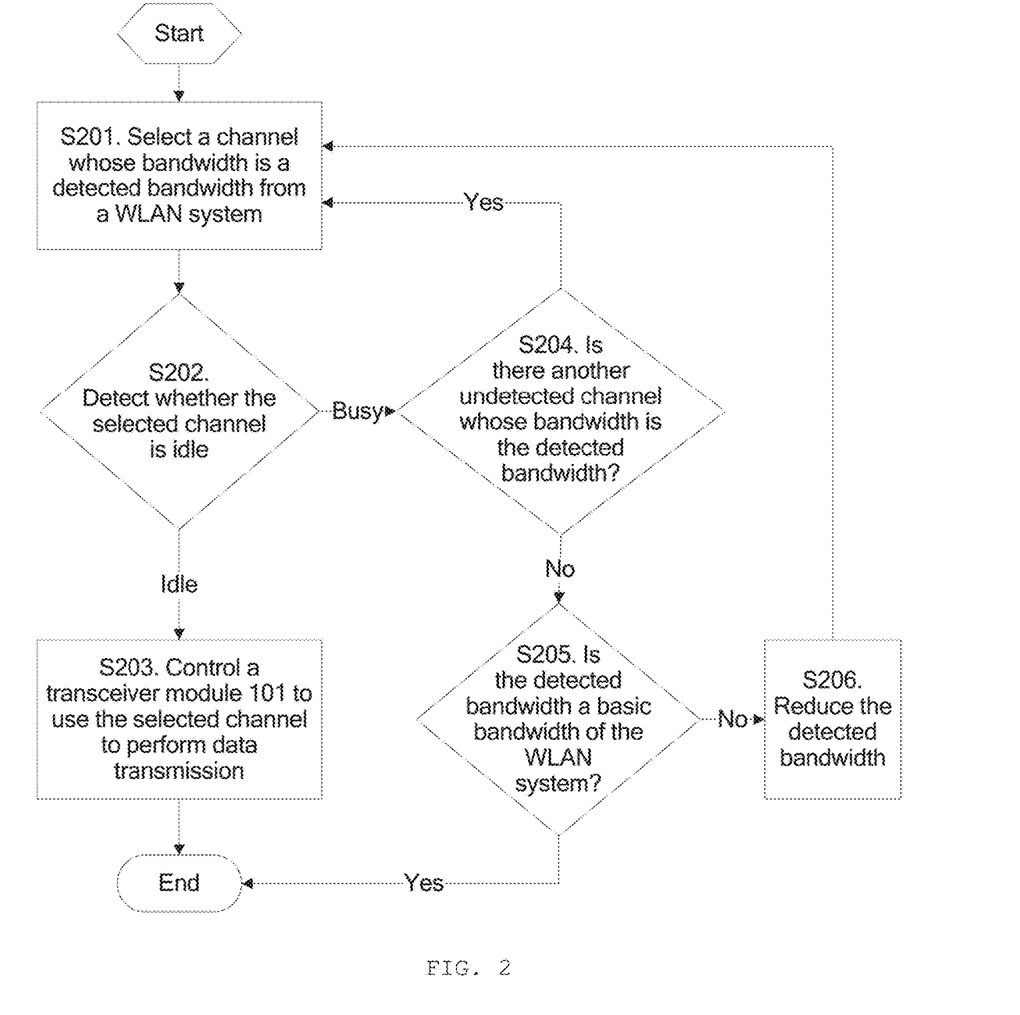
FIG. 2 is a flowchart of processing of a processing module in a first wireless communication apparatus according to an embodiment of the present disclosure.
Figure 3:
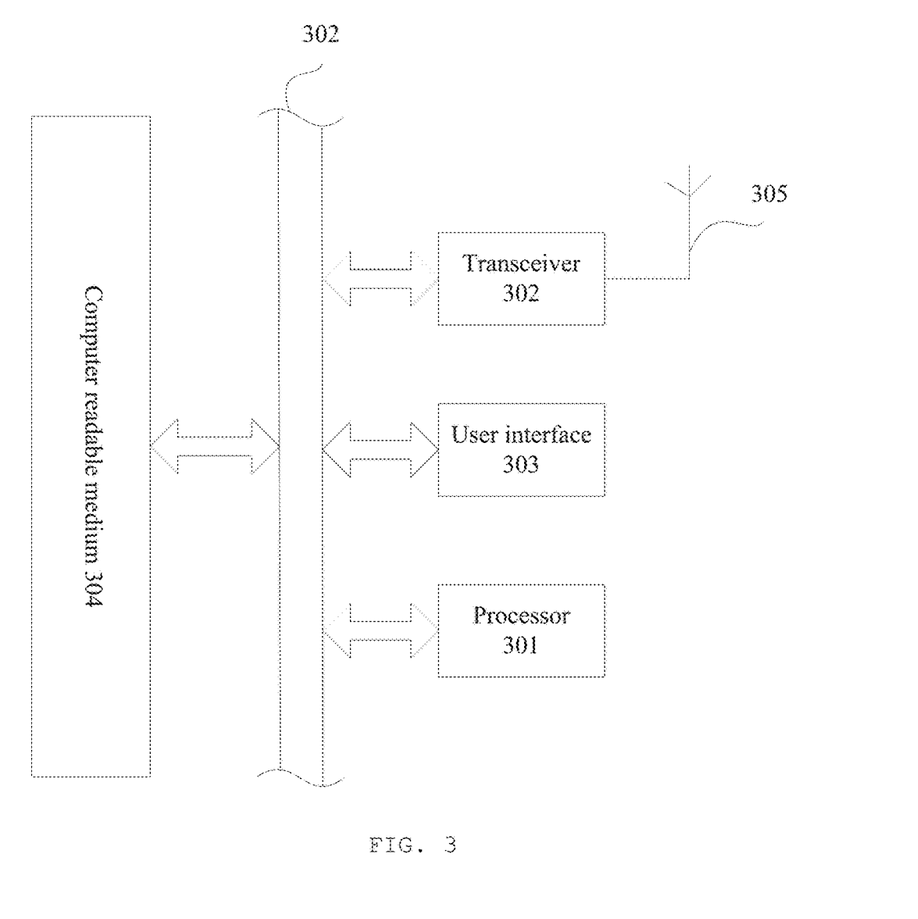
FIG. 3 is a schematic structural diagram of a wireless communication node according to an embodiment of the present disclosure.
Figure 4A:
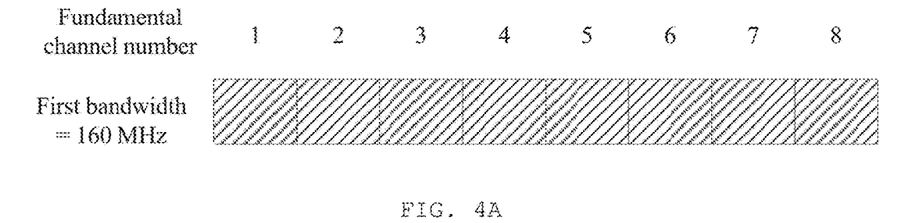
FIG. 4A to FIG. 4E are schematic diagrams of a manner of selecting a channel by using an equal division method.
Figure 4B:
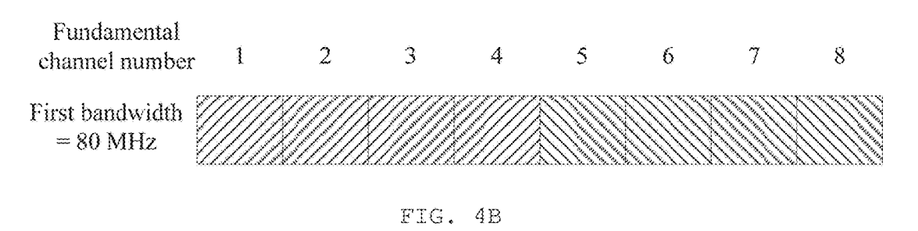
Figure 4C:
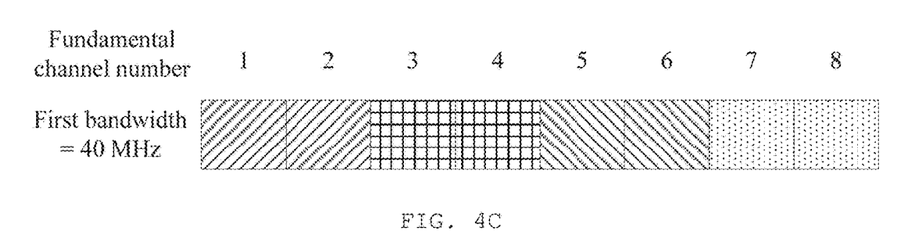
Figure 4D:
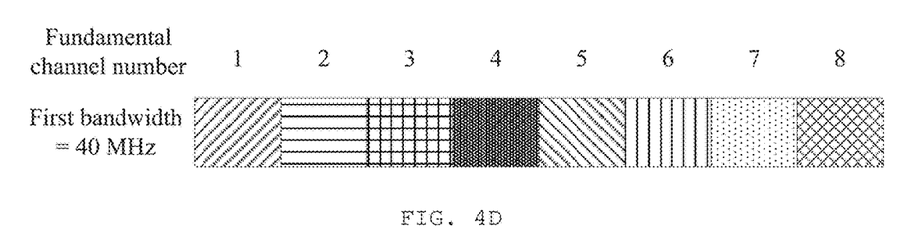
Figure 4E:
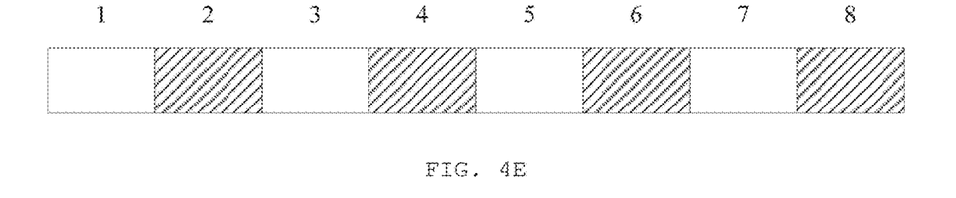
Figure 5A:
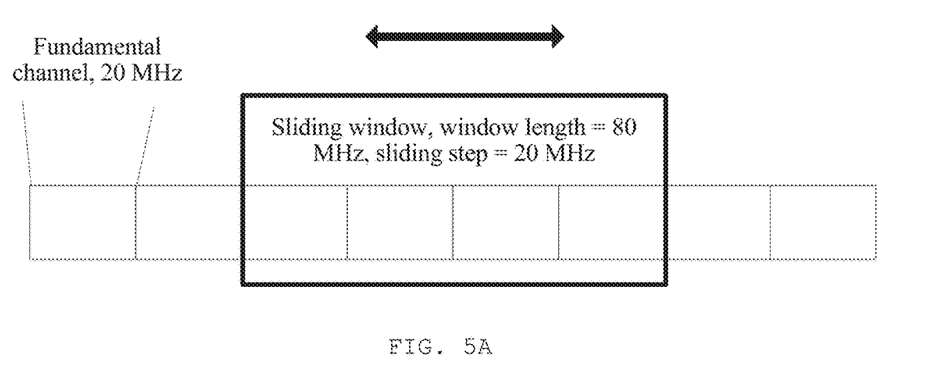
FIG. 5A is a schematic diagram of a manner of selecting a channel by using a sliding window method.
Figure 5B:
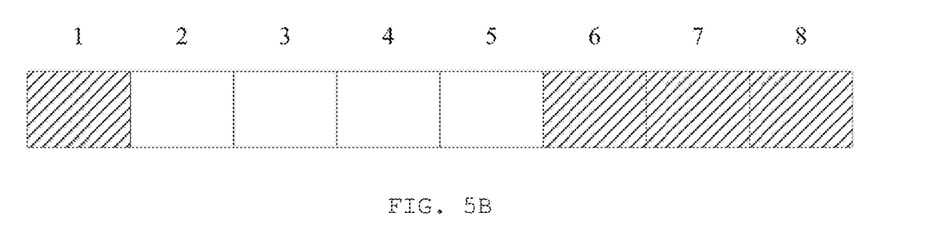
FIG. 5B is a schematic diagram of a channel occupation status.
Figure 5C:
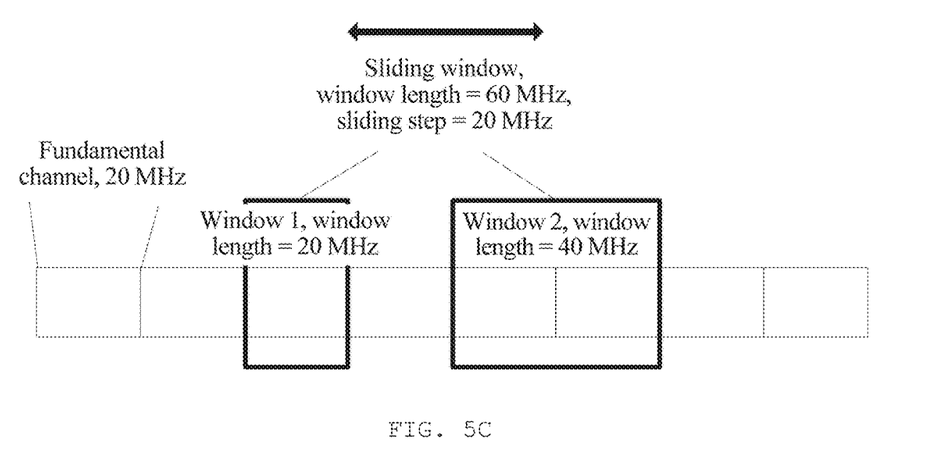
FIG. 5C is schematic diagram of another manner of selecting a channel by using a sliding window method.
Figure 6A:
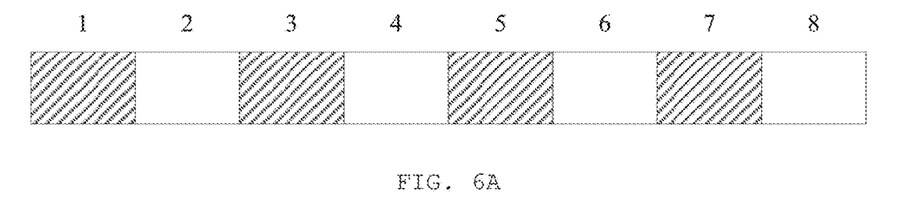
FIG. 6A and FIG. 6B are schematic diagrams of a case that a to-be-detected bandwidth includes discrete basic frequency bands.
Figure 6B:
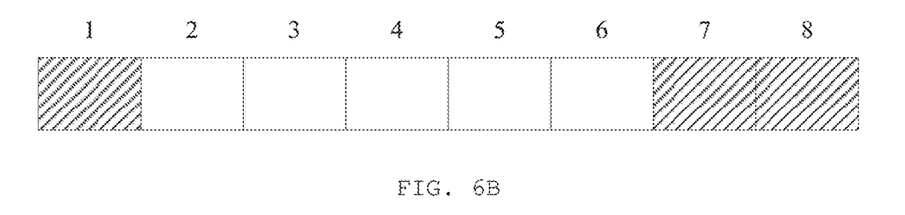
Figure 7:
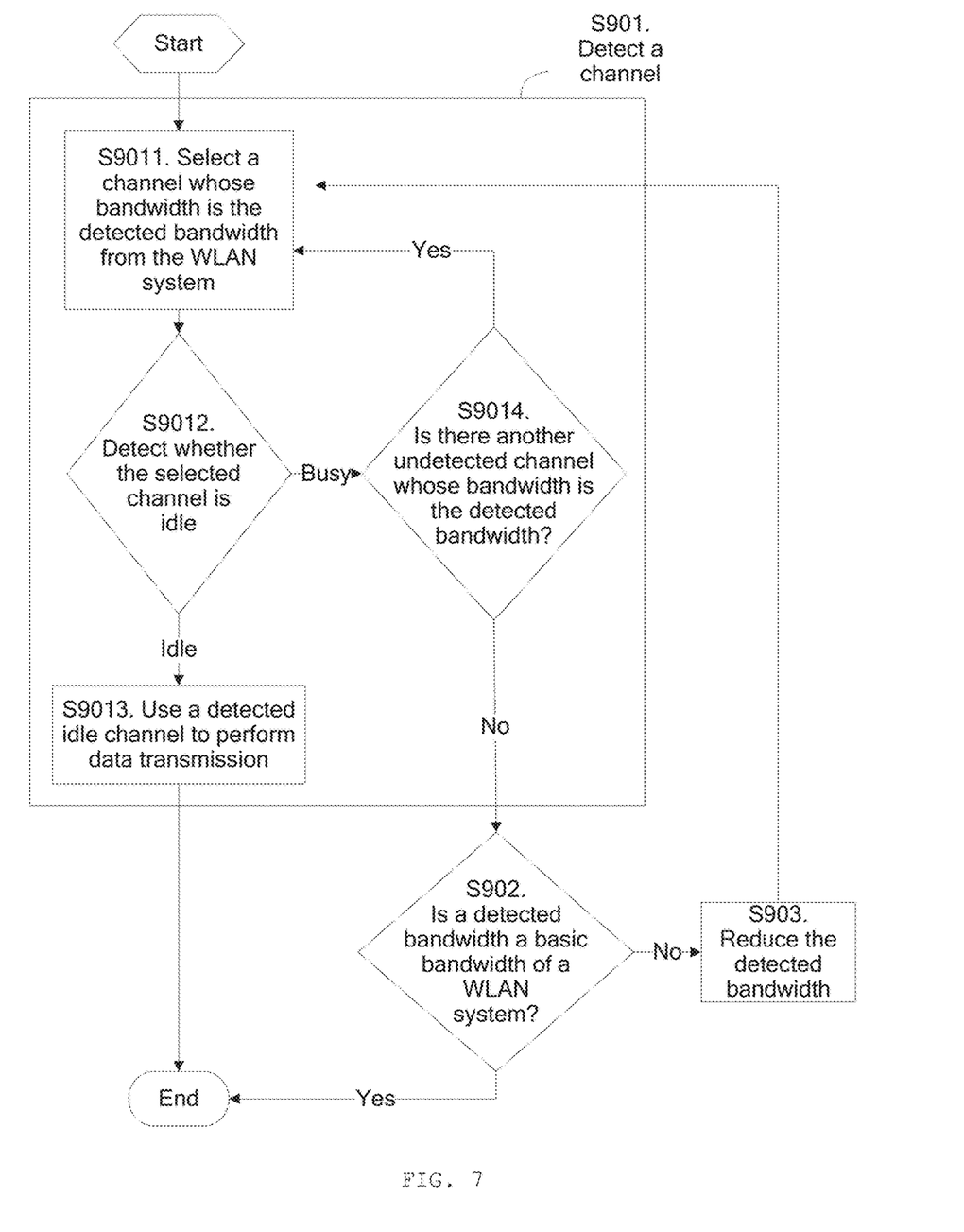
FIG. 7 is a flowchart of a channel detection method according to an embodiment of the present disclosure.

| Embodiment | Content | Drawing |
| --- | --- | --- |
| Embodiment 1 | First wireless communication apparatus | FIG. 1B, and FIG. 2 |
| Embodiment 2 | Wireless communication node | FIG. 3 |
| Embodiment 3 | Second wireless communication apparatus | FIG. 3 |
| Embodiment 4 | Computer program product used for wireless communication | FIG. 3 |
| Embodiment 5 | Channel selection by using an equal division method | FIG. 4A to FIG. 4E |
| Embodiment 6 | Channel selection by using a sliding window method | FIG. 5A to FIG. 5C |
| Embodiment 7 | Selected channel including several consecutive basic frequency bands | FIG. 4A to FIG. 4D |
| Embodiment 8 | Selected channel including several discrete basic frequency bands | FIG. 6A, and FIG. 6B |
| Embodiment 9 | Channel detection method | FIG. 7 |

The following separately describes the foregoing embodiments in detail.

Embodiment 1

Embodiment 1 provides a first wireless communication apparatus. The wireless communication apparatus can be applied to a wireless communication node, such as a WLAN node in a WLAN system. Optionally, the WLAN node may be an AP or a STA. Referring to FIG. 1, the wireless communication apparatus includes:

a processing module 101 and a transceiver module 102.

The transceiver module 102 is configured to perform data transmission; and the processing module 101 is configured to:

execute processing of the following steps:

performing a step of selecting a channel, where the step specifically includes: selecting a channel whose bandwidth is a to-be-detected bandwidth from a WLAN system, where the to-be-detected bandwidth is an integer multiple of a basic bandwidth of the WLAN system, and an initial value is greater than the basic bandwidth of the WLAN system; detecting whether the selected channel whose bandwidth is the to-be-detected bandwidth is idle; and when a detection result is idle, controlling the transceiver module 102 to use the channel to perform data transmission; or when a detection result is busy, selecting another channel whose bandwidth is the to-be-detected bandwidth from the WLAN system, and returning to the step of detecting whether the selected channel whose bandwidth is the to-be-detected bandwidth is idle; and when the following condition is met, reducing the to-be-detected bandwidth and returning to the step of selecting a channel:

in the step of selecting a channel, it is detected that all selected channels whose bandwidth is the to-be-detected bandwidth in the WLAN system are busy, and the to-be-detected bandwidth is greater than the basic bandwidth of the WLAN system.

The WLAN system may include multiple STAs and APs. Different STAs or different APs contend for a channel of the WLAN system. Before using a channel, the STA or the AP needs to detect whether the channel is available, that is, the channel is idle or busy.

A to-be-detected bandwidth refers to a bandwidth value of a currently detected channel, such as 160 MHz, 80 MHz, 40 MHz, and 20 MHz. For ease of description, the bandwidth value of the currently detected channel is referred to as to-be-detected bandwidth for short.

As described above, the basic bandwidth may be a bandwidth of a primary channel and a secondary channel in the WLAN system. Currently, the basic bandwidth is 20 MHz. However, with development of technologies, a value of the basic bandwidth may change. Nevertheless, any change shall fall within the protection scope of this patent. In this embodiment of the present disclosure, the basic bandwidth is a base unit for selecting a channel by the wireless communication apparatus. A bandwidth of a channel selected by the wireless communication apparatus, that is, a bandwidth of the detected channel should be an integer multiple of the basic bandwidth.

This embodiment of the present disclosure is intended to provide a solution that is different from an existing CCA detection solution. One of main differences is that, in this embodiment of the present disclosure, during channel selection, a channel is selected from a higher bandwidth to a lower bandwidth. This realizes a purpose that a channel is flexibly detected, an idle channel with a higher bandwidth can be detected more quickly, and channel detection efficiency is higher. A basic bandwidth only provides a selection manner of selecting a channel by a wireless communication apparatus, that is, a bandwidth of a selected channel is an integer multiple of the basic bandwidth. Therefore, based on this, no matter how the basic bandwidth is defined, provided that the solution of this embodiment of the present disclosure is used, detection is performed by selecting a channel from a higher bandwidth to a lower bandwidth, to realize a purpose that a channel is flexibly detected, an idle channel with a higher bandwidth is detected more quickly, and channel detection efficiency is higher.

It should be noted that a channel detection solution provided in Embodiment 1 of the present disclosure not only can be used for a WLAN node, but also can be used for a node in another wireless communication system. Provided that the system also needs an idle channel, the solution of Embodiment 1 may be used, to realize a purpose that a channel is flexibly detected, an idle channel with a higher bandwidth is detected more quickly, and channel detection efficiency is higher.

For processing of the processing module 101, reference may be made to a flowchart in FIG. 2. As shown in FIG. 2, a processing flow of the processing module 101 includes the following steps:

S201. Select a channel whose bandwidth is a to-be-detected bandwidth from the WLAN system.

S202. Detect whether the selected channel is idle. If the selected channel is idle, perform step S203; or if the selected channel is busy, perform step S204.

S203. Control the transceiver module 101 to use the selected channel to perform data transmission. Then, the flow ends.

S204. Determine whether there is another undetected channel whose bandwidth is the to-be-detected bandwidth. If there is another undetected channel whose bandwidth is the to-be-detected bandwidth, return to step S201; or if there is no another undetected channel whose bandwidth is the to-be-detected bandwidth, perform step S205.

S205. Determine whether the to-be-detected bandwidth is the basic bandwidth of the WLAN system. If yes, the flow ends; if no, perform step S206.

S206. Reduce the to-be-detected bandwidth and return to step S201.

That the system bandwidth is 160 MHz and the basic bandwidth is 20 MHz is used as an example. The to-be-detected bandwidth may be reduced in multiple manners. For example, the to-be-detected bandwidth is reduced successively according to a fixed step or an unfixed step. Optionally, there are multiple implementation manners. Description herein is merely an example and is not intended for limitation.

For example, the to-be-detected bandwidth is reduced from 160 MHz, to 140 MHz, and successively to 20 MHz according to a step 20 MHz.

For another example, the to-be-detected bandwidth is reduced from 160 MHz to 120 MHz, 80 MHz, and 40 MHz according to a step 40 MHz, and is reduced by 40 MHz each time.

Alternatively, the to-be-detected bandwidth is reduced from 140 MHz to 100 MHz, 60 MHz, and 40 MHz according to a step 40 MHz, and is reduced by 40 MHz each time.

Alternatively, for example, the to-be-detected bandwidth is reduced successively according to 120 MHz→80 MHz→60 MHz→20 MHz, instead of a fixed step.

For another example, the unfixed step may be $2^i$ times the basic bandwidth, and i is decreased successively from a natural number by 1. In this case, the to-be-detected bandwidth is $2^n$ times the basic bandwidth, and the system bandwidth of the WLAN system is $2^m$ times the basic bandwidth, where n and m are integers, and $0 \leq n \leq m$. For specific examples, reference may be made to the following Embodiment 3 and Embodiment 4.

For example, if the system bandwidth of the WLAN system is 160 MHz, and the basic bandwidth is 20 MHz, the to-be-detected bandwidth may be 160 MHz, 80 MHz, 40 MHz, and 20 MHz.

Optionally, a system frequency band of the WLAN system includes $2^m$ basic frequency bands that are numbered 1 to $2^m$ from a low frequency to a high frequency, and the to-be-detected bandwidth is $2^n$ times the basic bandwidth. The system frequency band is averagely divided into $2^{m-n}$ sections from a low frequency to a high frequency. A bandwidth of the basic frequency band is the basic bandwidth of the WLAN system, and a bandwidth of the system frequency band is the system bandwidth of the WLAN system. The channel whose bandwidth is the to-be-detected bandwidth is a channel including $2^{m-n}$ frequency bands obtained by averagely dividing the foregoing system frequency band, specifically, a channel in a channel including first $2^n$ basic frequency bands in the $2^m$ basic frequency bands, a channel including next $2^n$ basic frequency bands, . . . , and a channel including last $2^n$ basic frequency bands.

For example, when n=0, the to-be-detected bandwidth is the basic bandwidth of the WLAN system, and the channel whose bandwidth is the to-be-detected bandwidth is: a channel including a basic frequency band that is numbered 1, a channel including a basic frequency band that is numbered 2, . . . , or a channel including a basic frequency band that is numbered $2^m$.

For another example, when n=2, the to-be-detected bandwidth is four times the basic bandwidth of the WLAN system, and the channel whose bandwidth is the to-be-detected bandwidth is a channel in a channel including first four basic frequency bands, a channel including next four basic frequency bands, . . . , and a channel including last four basic frequency bands. If m=3, the channel whose bandwidth is the to-be-detected bandwidth is one of the following two channels: a channel including first four basic frequency bands, or a channel including last four basic frequency bands.

For a specific example, reference may be made to the following Embodiment 5.

Optionally, the channel whose bandwidth is the to-be-detected bandwidth includes one or multiple consecutive basic frequency bands. For details, reference may be made to the following Embodiment 7.

Alternatively, the channel whose bandwidth is the to-be-detected bandwidth includes multiple discrete basic frequency bands. For details, reference may be made to the following Embodiment 8.

Optionally, the processing module 101 may detect whether the selected channel whose bandwidth is the to-be-detected bandwidth is idle in the following manner.

When signal energy detected on the channel is not less than Th1−10 $\log_{10}$ (system bandwidth/to-be-detected bandwidth), it is determined that the channel is busy, or when signal energy detected on the channel is greater than Th1−10 $\log_{10}$ (system bandwidth/to-be-detected bandwidth), it is determined that the channel is idle. Th1 is a preset power threshold, and a unit is dBm.

For example, if the to-be-detected bandwidth is equal to the system bandwidth, when signal energy detected on the channel whose bandwidth is the to-be-detected bandwidth is not less than Th1, it is determined that the channel is busy, or when signal energy detected on the channel whose bandwidth is the to-be-detected bandwidth is less than Th1, it is determined that the channel is idle; or if the to-be-detected bandwidth is equal to a half of the system bandwidth, when signal energy detected on the channel whose bandwidth is the to-be-detected bandwidth is not less than Th1−3 dB, it is determined that the channel is busy, or when signal energy detected on the channel whose bandwidth is the to-be-detected bandwidth is less than Th1−3 dB, it is determined that the channel is idle.

In a specific example, the system bandwidth of the WLAN system is 160 MHz, and the basic bandwidth of the WLAN system is 20 MHz.

If the to-be-detected bandwidth is 160 MHz, when signal energy detected on the channel is not less than −73 dBm, it is determined that the channel is busy, or when signal energy detected on the channel is less than −73 dBm, it is determined that the channel is idle; or if the to-be-detected bandwidth is 80 MHz, when signal energy detected on the channel is not less than −76 dBm, it is determined that the channel is busy, or when signal energy detected on the channel is less than −76 dBm, it is determined that the channel is idle; or if the to-be-detected bandwidth is 40 MHz, when signal energy detected on the channel is not less than −79 dBm, it is determined that the channel is busy, or when signal energy detected on the channel is less than −79 dBm, it is determined that the channel is idle; or if the to-be-detected bandwidth is 20 MHz, when signal energy detected on the channel is not less than −82 dBm, it is determined that the channel is busy, or when signal energy detected on the channel is less than −82 dBm, it is determined that the channel is idle.

The foregoing describes the first wireless communication apparatus provided in Embodiment 1. The following describes a wireless communication node, a wireless communication apparatus, a computer readable medium, and a channel detection method provided the embodiments. A principle of performing channel detection by using the wireless communication node, the wireless communication apparatus, the computer readable medium, or the channel detection method is the same as that of the first wireless communication apparatus. For implementation, reference may be made to implementation of the first wireless communication apparatus. Repeated description is not further provided.

Embodiment 2

As shown in FIG. 3, a wireless communication node provided in Embodiment 2 includes:

a processor 301 and a transceiver 302.

The transceiver 302 is configured to perform data transmission; and the processor 301 is configured to:

execute processing of the following steps:

performing a step of selecting a channel, where the step specifically includes: selecting a channel whose bandwidth is a to-be-detected bandwidth from the WLAN system, where the to-be-detected bandwidth is an integer multiple of a basic bandwidth of the WLAN system, and an initial value is greater than the basic bandwidth of the WLAN system; detecting whether the selected channel whose bandwidth is the to-be-detected bandwidth is idle; and when a detection result is idle, controlling the transceiver module 302 to use the channel to perform data transmission; or when a detection result is busy, selecting another channel whose bandwidth is the to-be-detected bandwidth from the WLAN system, and return to the step of detecting whether the selected channel whose bandwidth is the to-be-detected bandwidth is idle; and when the following condition is met, reducing the to-be-detected bandwidth and returning to the step of selecting a channel:

in the step of selecting a channel, it is detected that all selected channels whose bandwidth is the to-be-detected bandwidth in the WLAN system are busy, and the to-be-detected bandwidth is greater than the basic bandwidth of the WLAN system.

In FIG. 3, a bus architecture may include any quantity of interconnected buses and bridges, and specifically links together various circuits of one or more processors represented by the processor 301 and one or more memories represented by a computer readable medium 304. The bus architecture may further link together various other circuits, such as a peripheral device, a voltage regulator, and a power management circuit. This is well known in the art, and therefore, this specification provides no further description.

A bus 302 provides a bus interface for devices in FIG. 3, such as the processor 301, and the transceiver 301. The transceiver 302 may be multiple components, that is, the transceiver 302 includes a transmitter and a receiver, and provides a unit that is configured to communicate with various other apparatuses on a transmission medium. For different user equipments, a user interface 303 may further be an interface that can be externally connected to a device. The connected device includes but is not limited to a keypad, a monitor, a loudspeaker, a microphone, a joystick, and the like. The transceiver 302 sends and receives a wireless signal by using an antenna 305. The antenna 305 includes one or more antennas.

Alternatively, all devices in FIG. 3 may be connected without using the bus architecture in FIG. 3. For example, the transceiver 302, the computer readable medium 304, and the user interface 303 are all connected to the processor 301.

In the wireless communication node provided in Embodiment 2, for implementation of the transceiver 302, reference may be made to the transceiver module 102 in the wireless communication apparatus provided in Embodiment 1; for implementation of the processor 301, reference may be made to the processing module 101 in the wireless communication apparatus provided in Embodiment 1. Repeated description is not further provided. All optional details about the wireless communication node in Embodiment 2 of the foregoing specification are not described, either.

Embodiment 3

Embodiment 3 provides a second wireless communication apparatus according to an embodiment of the present disclosure. The wireless communication apparatus may include the processor 301 and the transceiver 302 in FIG. 3.

For implementation of the transceiver 302, reference may be made to the transceiver module 102 in the wireless communication apparatus provided in Embodiment 1; for implementation of the processor 301, reference may be made to the processing module 101 in the wireless communication apparatus provided in Embodiment 1. Repeated description is not further provided.

The processor 301 and the transceiver 302 are integrated on a chip for implementation. Communication between the wireless communication node and another node is implemented by connecting the transceiver 302 to an antenna 305.

Optionally, the chip may further integrate a computer readable medium 304, a user interface 303, and the like.

Embodiment 4

Embodiment 4 provides a computer program product used for wireless communication, which includes the computer readable medium 304 in FIG. 3. The computer readable medium 304 includes an instruction that can be used to perform the following operation steps:

performing an operation step of selecting a channel, where the step specifically includes: selecting a channel whose bandwidth is a to-be-detected bandwidth from a WLAN system, where the to-be-detected bandwidth is an integer multiple of a basic bandwidth of the WLAN system, and an initial value is greater than the basic bandwidth of the WLAN system; detecting whether the selected channel whose bandwidth is the to-be-detected bandwidth is idle; and when a detection result is idle, using the channel to perform data transmission; or when a detection result is busy, selecting another channel whose bandwidth is the to-be-detected bandwidth from the WLAN system, and returning to the step of detecting whether the selected channel whose bandwidth is the to-be-detected bandwidth is idle; and when the following condition is met, reducing the to-be-detected bandwidth and returning to the step of selecting a channel:

in the step of selecting a channel, it is detected that all selected channels whose bandwidth is the to-be-detected bandwidth in the WLAN system are busy, and the to-be-detected bandwidth is greater than the basic bandwidth of the WLAN system.

The computer readable medium 304 can specifically implement various processing that is performed by the processor 101 in Embodiment 1. For implementation of the computer readable medium 304, reference may be made to Embodiment 1. Repeated description is not further provided.

Embodiment 5 to Embodiment 8 described below describe several optional solutions for channel detection that is performed by a wireless communication apparatus and a wireless communication node that are provided in the embodiments of the present disclosure. Implementation manners of the optional solutions are applicable to Embodiment 1 to Embodiment 4 and Embodiment 9 of the present disclosure.

Embodiment 5

In Embodiment 5, a wireless communication node selects a channel whose bandwidth is a to-be-detected bandwidth by using an equal division method. By using the equal division method, in a system bandwidth, a quantity of selectable channels whose bandwidth is the to-be-detected bandwidth is relatively small. However, an idle channel can be found more quickly, thereby reducing channel detection complexity.

In Embodiment 5, a system frequency band of a WLAN system includes $2^m$ basic frequency bands that are numbered 1 to $2^m$ from a low frequency to a high frequency, and the to-be-detected bandwidth is $2^n$ times a basic bandwidth. The system frequency band is averagely divided into $2^{m-n}$ sections from a low frequency to a high frequency. The channel whose bandwidth is the to-be-detected bandwidth is a channel including $2^{m-n}$ frequency bands obtained by averagely dividing the foregoing system frequency band, specifically, a channel in a channel including first $2^n$ basic frequency bands in the $2^m$ basic frequency bands, a channel including next $2^n$ basic frequency bands, . . . , and a channel including last $2^n$ basic frequency bands.

That the system bandwidth, namely, a bandwidth of the system frequency band is 160 MHz, and the basic bandwidth, namely, a bandwidth of the basic frequency band is 20 MHz is used as an example. When m=3, the system frequency band includes eight basic frequency bands that are numbered 1 to 8.

As shown in FIG. 4A, if the to-be-detected bandwidth is 160 MHz, n=3. The system frequency band is averagely divided into $2^{m-n}=1$ section from a low frequency to a high frequency, that is, a channel of the to-be-detected bandwidth includes eight basic frequency bands that are numbered 1 to 8. In other words, the entire system bandwidth is occupied, as shown in shaded parts in FIG. 4A.

As shown in FIG. 4B, if the to-be-detected bandwidth is 80 MHz, n=2. The system frequency band is averagely divided into $2^{m-n}=2$ sections from a low frequency to a high frequency, that is, there are two channels whose bandwidth is the to-be-detected bandwidth: a channel including four basic frequency bands that are numbered from 1 to 4, and a channel including four basic frequency bands that are numbered from 5 to 8. Different shaded parts in FIG. 4B represent different channels whose bandwidth is the to-be-detected bandwidth.

As shown in FIG. 4C, if the to-be-detected bandwidth is 40 MHz, n=1. The system frequency band is averagely divided into $2^{m-n}=4$ sections from a low frequency to a high frequency, that is, there are four channels whose bandwidth is the to-be-detected bandwidth: a channel including two basic frequency bands that are numbered 1 and 2, a channel including two basic frequency bands that are numbered 3 and 4, . . . , and a channel including two basic frequency bands that are numbered 7 and 8. Different shaded parts in FIG. 4C represent different channels whose bandwidth is the to-be-detected bandwidth.

As shown in FIG. 4D, if the to-be-detected bandwidth is 20 MHz, n=0. The system frequency band is averagely divided into $2^{m-n}=8$ sections from a low frequency to a high frequency, that is, there are eight channels whose bandwidth is the to-be-detected bandwidth: each occupies one basic frequency band. Different shaded parts in FIG. 4D represent different channels whose bandwidth is the to-be-detected bandwidth.

If a channel is selected with the to-be-detected bandwidth being the system bandwidth first, in Embodiment 5, if it is detected that a channel whose detected bandwidth is 160 MHz is busy, the to-be-detected bandwidth is reduced to 80 MHz, and it is detected whether one of the two channels whose to-be-detected bandwidth is 80 MHz shown in FIG. 4B is busy. If the channel is busy, it is detected whether the other channel whose bandwidth is 80 MHz is busy. If both channels are busy, the to-be-detected bandwidth continues to be reduced to 40 MHz, and it is detected whether one of the four channels whose to-be-detected bandwidth is 40 MHz shown in FIG. 4C is busy. If the channel is busy, it is detected whether another channel whose to-be-detected bandwidth is 40 MHz is busy. If an idle channel is detected, data transmission is performed by using the idle channel; or if no idle channel is detected, detection continues until it is detected that the four channels whose to-be-detected bandwidth is 40 MHz are all busy. In this case, the to-be-detected bandwidth is further reduced to 20 MHz, and the foregoing process is repeated to continue with detection. Because 20 MHz is the basic bandwidth, if it is detected that the eight channels whose to-be-detected bandwidth is 20 MHz are all busy, it is determined that there is no idle channel in the WLAN system.

In Embodiment 5, a quantity of to-be-detected channels whose bandwidth is a to-be-detected bandwidth is reduced due to use of an equal division method; therefore, channel detection complexity is reduced and detection efficiency is improved, especially when a basic frequency band in a system bandwidth is discretely occupied, as shown in FIG. 4E. Shaded parts are occupied base frequency channel numbers. By using the equal division method, if detection is performed in ascending order of channel numbers, an idle channel may be detected by means detection of eight times in total: a 160 MHz channel is detected once, 80 MHz channels are detected twice, 40 MHz channels are detected four times, and a 20 MHz channel is detected once. Compared with a sliding window method provided in Embodiment 6, detection efficiency of the equal division method is higher.

Embodiment 6

In Embodiment 6, a wireless communication node selects a channel by using a sliding window method. A size of a sliding window is a to-be-detected bandwidth. Sliding on a system frequency band by using the sliding window implements a process, for example, a process of selecting a channel whose bandwidth is a to-be-detected bandwidth from the WLAN system in S201 described above.

In short, a channel including frequency bands contained in the sliding window is the selected channel. Each time the sliding window moves by a sliding step, a window is determined, that is, a to-be-detected channel is selected. The sliding step may be set according to a situation. A size of the sliding step affects a quantity of channels to be selected. A smaller sliding step indicates more channels to be selected. In an actual application, an appropriate sliding step may be determined according to a basic bandwidth and\or a to-be-detected bandwidth of a system. A special case that the sliding step is equal to the to-be-detected bandwidth is the case described in Embodiment 3 described above.

In addition, the sliding window may also be a non-consecutive window. In other words, the sliding window includes multiple small windows. A total window length (or size) of the sliding window is the to-be-detected bandwidth.

For simplicity of illustration, the following case is still used as an example for description: the to-be-detected bandwidth is $2^n$ times the basic bandwidth, and a system bandwidth of the WLAN system is $2^m$ times the basic bandwidth, where n and m are integers, and $0 \leq n \leq m$. In a specific example, for comparison with Embodiment 5, the system bandwidth is still 160 MHz, and the to-be-detected bandwidth is reduced successively according to a sequence of 160 MHz→80 MHz→40 MHz→20 MHz. Optionally, in a case of a to-be-detected bandwidth, a sliding step may be the basic bandwidth, that is, 20 MHz; or the sliding step may not be the basic bandwidth. For example, the sliding step is 10 MHz, that is, the sliding window changes by 10 MHz each time, and it is detected once whether a channel in the sliding window is idle.

In addition, the sliding step may also change in the process of selecting a channel. For example, the system bandwidth is 160 MHz, and when a channel is selected from the first 80 MHz in the system bandwidth, the sliding step is 20 MHz; and when a channel is selected in the last 80 MHz in the system bandwidth, the sliding step is 10 MHz.

In Embodiment 6, as shown in FIG. 5A, there is only one to-be-selected channel whose to-be-detected bandwidth is 160 MHz, and this is the same as that in Embodiment 5. However, there are five to-be-selected channels whose to-be-detected bandwidth is 80 MHz. Likewise, there are seven to-be-selected channels whose to-be-detected bandwidth is 40 MHz, and there are eight to-be-selected channels whose to-be-detected bandwidth is 20 MHz. For clarity of illustration, FIG. 5A does not show the channels whose to-be-detected bandwidth is 40 MHz or 20 MHz, and a principle of a sliding window thereof is the same as that of the 80 MHz to-be-detected bandwidth.

If the eight basic frequency bands are also numbered in a numbering manner same as that in FIG. 4E, and sliding is performed in a direction from a basic frequency band with a small serial number to a basic frequency band with a large serial number, and if a channel occupation status is shown in FIG. 4E, by using the sliding window method in Embodiment 6, an idle channel can be detected by means of detection of 14 times in total: a 160 MHz channel is detected once, 80 MHz channels are detected five times, 40 MHz channels are detected seven times, and a 20 MHz channel is detected once.

However, for a channel occupation status shown in FIG. 5B, if a sliding window slides in a direction from a basic frequency band with a small serial number to a basic frequency band with a large serial number, although a half of the system bandwidth is occupied, which is the same as that in FIG. 4E, an idle channel can be detected by means of detection of only three times by using the method in Embodiment 6, and a bandwidth of the detected idle channel is 80 MHz, which is greater than the 20 MHz bandwidth detected in Embodiment 5. It can be seen that, for different channel occupation statuses, relatively high channel detection efficiency can be obtained by using an appropriate method.

FIG. 5C shows an example of a non-consecutive sliding window. The sliding window includes a window 1 and a window 2, a window length (or size) of the window 1 is 10 MHz, a window length (or size) of the window 2 is 20 MHz, and a total window length (size) of the sliding window is 30 MHz, that is, a bandwidth of a detected channel obtained in the sliding window is 30 MHz.

Embodiment 7

In Embodiment 7, a channel whose bandwidth is a to-be-detected bandwidth includes several consecutive basic frequency bands, for example, basic frequency bands shown in FIG. 4A to FIG. 4C.

In FIG. 4A, a channel whose bandwidth is the to-be-detected bandwidth includes eight consecutive basic frequency bands that are numbered from 1 to 8.

In FIG. 4B, channels whose bandwidth is the to-be-detected bandwidth separately include four consecutive basic frequency bands that are numbered from 1 to 4 or 5 to 8.

In FIG. 4C, channels whose bandwidth is the to-be-detected bandwidth separately include two consecutive basic frequency bands that are numbered 1 and 2, 3 and 4, 5 and 6, or 7 and 8.

The channel selection by using the equal division method in the foregoing Embodiment 5 may be regarded as a special manner of Embodiment 7.

Embodiment 8

In Embodiment 8, a channel whose bandwidth is a to-be-detected bandwidth includes several discrete basic frequency bands.

That a system bandwidth is 160 MHz and a basic bandwidth is 20 MHz is still used as an example. A system frequency band includes eight basic frequency bands that are numbered from 1 to 8. For example, as shown in FIG. 6A, the to-be-detected bandwidth is 80 MHz, and the channel whose bandwidth is the to-be-detected bandwidth may include four basic frequency bands that are numbered 1, 3, 5, and 7. For another example, as shown in FIG. 6B, the to-be-detected bandwidth is 60 MHz, and the channel whose bandwidth is the to-be-detected bandwidth may include three basic frequency bands that are numbered 1, 7, and 8.

In Embodiment 8, the channel whose bandwidth is the to-be-detected bandwidth may include discrete basic frequency bands. In this way, a discrete frequency band in the system frequency band can be fully utilized, so as to implement data transmission with a high bandwidth and a higher data transmission rate.

As shown in FIG. 5C, a channel including discrete basic frequency bands in Embodiment 8 may also be obtained by using a non-consecutive sliding window in Embodiment 6.

Embodiment 9

Embodiment 9 provides a channel detection method, including:

S901: Perform a step of selecting a channel, where the step specifically includes:

S9011: Select a channel whose bandwidth is a to-be-detected bandwidth from a WLAN system, where the to-be-detected bandwidth is an integer multiple of a basic bandwidth of the WLAN system, and an initial value is greater than the basic bandwidth of the WLAN system.

S9012. Detect whether the selected channel whose bandwidth is the to-be-detected bandwidth is idle. If the selected channel is idle, perform step S9013; or if the selected channel is busy, perform step S9014.

S9013. Perform data transmission by using the detected idle channel. Then, the flow ends.

S9014. Determine whether an undetected channel whose bandwidth is the to-be-detected bandwidth further exists in the WLAN system. If an undetected channel whose bandwidth is the to-be-detected bandwidth exists in the WLAN system, return to step S9011; or if no undetected channel whose bandwidth is the to-be-detected bandwidth exists in the WLAN system, perform step S902.

S902. Determine whether the to-be-detected bandwidth is greater than the basic bandwidth of the WLAN system. If the to-be-detected bandwidth is greater than the basic bandwidth, perform step S903; or if the to-be-detected bandwidth is not greater than the basic bandwidth, the flow ends.

S903. Reduce the to-be-detected bandwidth and return to step S901 to select a channel.

Optionally, the to-be-detected bandwidth is $2^n$ times the basic bandwidth, and a system bandwidth of the WLAN system is $2^m$ times the basic bandwidth, where n and m are integers, and $0 \leq n \leq m$.

Optionally, a system frequency band of the WLAN system includes $2^m$ basic frequency bands. A bandwidth of a basic frequency band is the basic bandwidth of the WLAN system, and a bandwidth of the system frequency band is the system bandwidth of the WLAN system.

The channel whose bandwidth is the to-be-detected bandwidth includes the following frequency band: one frequency band in $2^{m-n}$ frequency bands obtained by averagely dividing the system frequency band.

Optionally, the channel whose bandwidth is the to-be-detected bandwidth includes one or multiple consecutive basic frequency bands; or includes multiple discrete basic frequency bands.

Optionally, the selecting a channel whose bandwidth is a to-be-detected bandwidth from a WLAN system includes:

selecting the channel whose bandwidth is the to-be-detected bandwidth from the WLAN system by using a sliding window method, where a width of a sliding window in the sliding window method is the to-be-detected bandwidth.

Optionally, the detecting whether the selected channel whose bandwidth is the to-be-detected bandwidth is idle includes:

determining, according to signal energy detected on the channel and the to-be-detected bandwidth, whether the selected channel whose bandwidth is the to-be-detected bandwidth is idle.

Optionally, the determining, according to signal energy detected on the channel and the to-be-detected bandwidth, whether the selected channel whose bandwidth is the to-be-detected bandwidth is idle includes:

determining an energy value according to the system bandwidth and the to-be-detected bandwidth of the WLAN system, where the determined energy value meets the following formula requirement:

$$Th1 - 10\log_{10}\frac{\text{System bandwidth}}{\text{First bandwidth}};$$

where

Th1 is a preset signal energy threshold, and a unit is dBm; and when the signal energy detected on the channel is not less than the determined energy value, determining that the channel is busy; or when the signal energy detected on the channel is less than the determined energy value, determining that the channel is idle.

Optionally, the system bandwidth of the WLAN system is 160 MHz, and the basic bandwidth of the WLAN system is 20 MHz; and the detecting whether the selected channel whose bandwidth is the to-be-detected bandwidth is idle includes:

if the to-be-detected bandwidth is 160 MHz, when signal energy detected on the channel is not less than −73 dBm, determining that the channel is busy, or when signal energy detected on the channel is less than −73 dBm, determining that the channel is idle; or if the to-be-detected bandwidth is 80 MHz, when signal energy detected on the channel is not less than −76 dBm, determining that the channel is busy, or when signal energy detected on the channel is less than −76 dBm, determining that the channel is idle; or if the to-be-detected bandwidth is 40 MHz, when signal energy detected on the channel is not less than −79 dBm, determining that the channel is busy, or when signal energy detected on the channel is less than −79 dBm, determining that the channel is idle; or if the to-be-detected bandwidth is 20 MHz, when signal energy detected on the channel is not less than −82 dBm, determining that the channel is busy, or when signal energy detected on the channel is less than −82 dBm, determining that the channel is idle.

In conclusion, according to the wireless communication apparatus, the wireless communication node, and the channel detection method provided in the embodiments of the present disclosure, during channel detection, the detection starts from a channel with a higher bandwidth, and a to-be-detected bandwidth is gradually reduced. This provides a flexible channel detection mechanism.

In one aspect, whether a primary channel is idle may not be considered during use of a channel. Therefore, the use of a channel is not limited by whether the primary channel is idle.

In another aspect, a detection manner from a higher bandwidth to a lower bandwidth may be used, so that an idle channel with a higher bandwidth can be detected more quickly. Channel detection efficiency is higher, and data transmission with a high bandwidth is more easily implemented.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A wireless communication apparatus, comprising:
a transceiver configured to perform data transmission; and
a processor configured to:
    (a) select a channel whose bandwidth is a to-be-detected bandwidth from a WLAN system, wherein the to-be-detected bandwidth is an integer multiple of a basic bandwidth of the WLAN system, and an initial value of the to-be-detected bandwidth is greater than the basic bandwidth of the WLAN system,
    (b) detect whether the selected channel whose bandwidth is the to-be-detected bandwidth is idle based on a determined energy value according to a system bandwidth and the to-be-detected bandwidth of the WLAN system, wherein the determined energy value meets a following formula requirement:

$$Th1 - 10\log_{10}\frac{\text{system bandwidth}}{\text{to-be-detected bandwidth}},$$

wherein Th1 is a preset signal energy threshold, and a unit is dBm, and when a signal energy detected on the channel is not less than the determined energy value, determine that the channel is busy, or when the signal energy detected on the channel is less than the determined energy value, determine that the channel is idle,
    (c) when a detection result is idle, control the transceiver to use the channel to perform data transmission, and when a detection result is busy, select another channel whose bandwidth is the to-be-detected bandwidth from the WLAN system and return to step (b), and
    when it is detected that all selected channels whose bandwidth is the to-be-detected bandwidth in the WLAN system are busy, and the to-be-detected bandwidth is greater than the basic bandwidth of the WLAN system, reduce the to-be-detected bandwidth and return to step (a).

2. The apparatus according to claim 1, wherein:
the to-be-detected bandwidth is $2^n$ times the basic bandwidth, and the system bandwidth of the WLAN system is $2^m$ times the basic bandwidth, wherein n and m are integers, and $0 \leq n \leq m$.

3. The apparatus according to claim 2, wherein:
a system frequency band of the WLAN system includes $2^m$ basic frequency bands, a bandwidth of the basic frequency band is the basic bandwidth of the WLAN system, and a bandwidth of the system frequency band is the system bandwidth of the WLAN system; and
the channel whose bandwidth is the to-be-detected bandwidth includes the following frequency band: one frequency band in $2^{m-n}$ frequency bands obtained by averagely dividing the system frequency band.

4. The apparatus according to claim 1, wherein the channel whose bandwidth is the to-be-detected bandwidth includes one or multiple consecutive basic frequency bands or includes multiple discrete basic frequency bands.

5. The apparatus according to claim 1, wherein the processor is further configured to:
select the channel whose bandwidth is the to-be-detected bandwidth from the WLAN system by using a sliding window method, wherein a width of a sliding window in the sliding window method is the to-be-detected bandwidth.

6. The apparatus according to claim 2, wherein:
the system bandwidth of the WLAN system is 160 MHZ, and the basic bandwidth of the WLAN system is 20 MHZ; and
the processor is further configured to:
when the to-be-detected bandwidth is 160 MHz, when signal energy detected on the channel is not less than −73 dBm, determine that the channel is busy, or when signal energy detected on the channel is less than −73 dBm, determine that the channel is idle, or
when the to-be-detected bandwidth is 80 MHz, when signal energy detected on the channel is not less than −76 dBm, determine that the channel is busy, or when signal energy detected on the channel is less than −76 dBm, determine that the channel is idle; or
when the to-be-detected bandwidth is 40 MHz, when signal energy detected on the channel is not less than −79 dBm, determine that the channel is busy, or when signal energy detected on the channel is less than −79 dBm, determine that the channel is idle, or
when the to-be-detected bandwidth is 20 MHz, when signal energy detected on the channel is not less than −82 dBm, determine that the channel is busy, or when signal energy detected on the channel is less than −82 dBm, determine that the channel is idle.

7. A channel detection method, comprising:
selecting a channel whose bandwidth is a to-be-detected bandwidth from a WLAN system, wherein the to-be-detected bandwidth is an integer multiple of a basic bandwidth of the WLAN system, and an initial value of the to-be-detected bandwidth is greater than the basic bandwidth of the WLAN system;
detecting whether the selected channel whose bandwidth is the to-be-detected bandwidth is idle based on a determined energy value according to a system bandwidth and the to-be-detected bandwidth of the WLAN system, wherein the determined energy value meets a following formula requirement:

$$Th1 - 10\log_{10}\frac{\text{system bandwidth}}{\text{to-be-detected bandwidth}},$$

wherein Th1 is a preset signal energy threshold, and a unit is dBm, and when a signal energy detected on the channel is not less than the determined energy value, determine that the channel is busy, or when the signal energy detected on the channel is less than the determined energy value, determine that the channel is idle;
when a detection result is idle, using the channel to perform data transmission, and when a detection result is busy, selecting another channel whose bandwidth is the to-be-detected bandwidth from the WLAN system, and returning to the step of detecting whether the selected channel whose bandwidth is the to-be-detected bandwidth is idle; and
when it is detected that all selected channels whose bandwidth is the to-be-detected bandwidth in the WLAN system are busy, and the to-be-detected bandwidth is greater than the basic bandwidth of the WLAN system, reducing the to-be-detected bandwidth and returning to the step of selecting a channel.

8. The method according to claim 7, wherein the to-be-detected bandwidth is $2^n$ times the basic bandwidth, and the system bandwidth of the WLAN system is $2^m$ times the basic bandwidth, wherein n and m are integers, and $0 \leq n \leq m$.

9. The method according to claim 8, wherein:
a system frequency band of the WLAN system includes $2^m$ basic frequency bands, a bandwidth of the basic frequency band is the basic bandwidth of the WLAN system, and a bandwidth of the system frequency band is the system bandwidth of the WLAN system; and
the channel whose bandwidth is the to-be-detected bandwidth includes the following frequency band: one frequency band in $2^{m-n}$ frequency bands obtained by averagely dividing the system frequency band.

10. The method according to claim 7, wherein the channel whose bandwidth is the to-be-detected bandwidth includes one or multiple consecutive basic frequency bands or includes multiple discrete basic frequency bands.

11. The method according to claim 7, wherein selecting a channel whose bandwidth is a to-be-detected bandwidth from a WLAN system comprises:
selecting the channel whose bandwidth is the to-be-detected bandwidth from the WLAN system by using a sliding window method, wherein a width of a sliding window in the sliding window method is the to-be-detected bandwidth.

12. The method according to claim 8, wherein:
the system bandwidth of the WLAN system is 160 MHZ, and the basic bandwidth of the WLAN system is 20 MHZ; and
the detecting whether the selected channel whose bandwidth is the to-be-detected bandwidth is idle comprises:
when the to-be-detected bandwidth is 160 MHz, when signal energy detected on the channel is not less than −73 dBm, determining that the channel is busy, or when signal energy detected on the channel is less than −73 dBm, determining that the channel is idle, or
when the to-be-detected bandwidth is 80 MHz, when signal energy detected on the channel is not less than −76 dBm, determining that the channel is busy, or when signal energy detected on the channel is less than −76 dBm, determining that the channel is idle, or
when the to-be-detected bandwidth is 40 MHz, when signal energy detected on the channel is not less than −79 dBm, determining that the channel is busy, or when signal energy detected on the channel is less than −79 dBm, determining that the channel is idle, or
when the to-be-detected bandwidth is 20 MHz, when signal energy detected on the channel is not less than −82 dBm, determining that the channel is busy, or when signal energy detected on the channel is less than −82 dBm, determining that the channel is idle.

\* \* \* \* \*